(12) United States Patent
Moldoveanu

(10) Patent No.: US 6,754,590 B1
(45) Date of Patent: Jun. 22, 2004

(54) SEISMIC SURVEYING METHOD

(75) Inventor: Nicolae Moldoveanu, Houston, TX (US)

(73) Assignee: WesternGeco, L.L.C., Houston, TX (US)

(*) Notice: Subject to any disclaimer, the term of this patent is extended or adjusted under 35 U.S.C. 154(b) by 0 days.

(21) Appl. No.: 09/979,511

(22) PCT Filed: May 16, 2000

(86) PCT No.: PCT/IB00/00654

§ 371 (c)(1),
(2), (4) Date: Nov. 16, 2001

(87) PCT Pub. No.: WO00/72049

PCT Pub. Date: Nov. 30, 2000

(51) Int. Cl.⁷ .................................. G01V 1/00

(52) U.S. Cl. .......................... 702/14; 367/56

(58) Field of Search ................ 702/14; 367/56

(56) References Cited

U.S. PATENT DOCUMENTS

| | | | | |
|---|---|---|---|---|
| 4,715,020 A | * | 12/1987 | Landrum, Jr. ............... | 367/38 |
| 4,823,326 A | * | 4/1989 | Ward .......................... | 367/41 |
| 4,914,636 A | * | 4/1990 | Garrotta ...................... | 367/56 |
| 6,028,818 A | * | 2/2000 | Jeffryes ....................... | 367/20 |
| 6,366,857 B1 | * | 4/2002 | Bird et al. ................... | 702/2 |
| 6,418,079 B1 | * | 7/2002 | Fleure ......................... | 367/40 |
| 6,519,533 B1 | * | 2/2003 | Jeffryes ....................... | 702/17 |

OTHER PUBLICATIONS

"Recent Developments in 3–D Acquisition Techniques Using Vibroseis in Oman", Wams et al., The Leading Edge, Aug. 1998.*

* cited by examiner

Primary Examiner—John Barlow
Assistant Examiner—Toan M. Le
(74) Attorney, Agent, or Firm—David S. Figatner; Williams, Morgan & Amerson

(57) ABSTRACT

An improved method of acquiring seismic data using a plurality of vibratory seismic sources including the steps of deploying a seismic sensor deploying a plurality of vibratory seismic sources at different source points; simultaneously actuating the seismic sources; acquiring seismic data attributable to the seismic sources using the seismic sensor; redeploying at least two seismic sourc, one seismic source being thereby positioned at a source point previously occupied by the other seismic source; simultaneously actuating the redeployed seismic sources; and acquiring seismic data attributable to the redeployed seismic sources using said seismic sensor. The present invention also involves an improved method of acquiring seismic data using a plurality of vibratory seismic sources, where each seismic source is capable of producing seismic energy within given frequency ranges, including the steps of deploying a seismic sensor, deploying a plurality of vibratory seismic sources at different source points; simultaneously actuating the seismic sources in such a manner that the frequency range of the seismic energy produced by one seismic source is substantially outside the frequency range of the seismic energy produced by another seismic source; and acquiring seismic data attributable to the seismic sources using the seismic sensor.

9 Claims, 5 Drawing Sheets

SEISMIC SURVEYING METHOD

BACKGROUND OF THE INVENTION

This invention relates generally to seismic surveying methods, and more particularly to an improved seismic surveying method of using a plurality of vibratory seismic sources.

Seismic vibrators have been used for many years on land to acquire seismic data and many companies have ongoing efforts to utilize similar sources in marine environments. The geophysical and environmental benefits of using these types of seismic sources are well known.

When seismic data is acquired utilizing a plurality of vibratory seismic sources, the vibrators are conventionally organized as a travelling source array. The vibrators are typically placed around or along a source point (also referred to as a "vibrator point" or a "vib point") with a particular separation distance, such as 40 meters. The vibrators then generate a certain number of sweeps that are received by a plurality of seismic sensors, recorded and stacked (i.e. combined) to produce a seismic data trace for each particular source point/receiver point pairing. The vibrators then travel as a group to the next source point where they are used in a similar manner.

There are several known problems with acquiring seismic data using seismic vibrators, however, including the need to acquire large numbers of relatively-long records for each source point/receiver point pair to produce seismic data having a sufficiently high signal to noise ratio. Other known problems with seismic data acquisition using seismic vibrators include harmonics, ground coupling differences, base-plate flexures, and source array effects.

Efforts have been made to address these problems, and one promising approach has been the simultaneous use of multiple vibrators at different source points, with each vibrator producing separable, encoded sweeps. One method using this approach, referred to as the High Fidelity Vibroseis Source ("HFVS") method, has been developed by Mobil Oil Corporation and Atlantic Richfield Company and is described in U.S. Pat. Nos. 5,550,786 (Aug. 27, 1996); 5,570,833 (Dec. 30, 1997); 5,715,213 (Feb. 3, 1998); and 5,721,710 (Feb. 24, 1998), all incorporated herein by reference. The HFVS method was developed primarily to improve the fidelity of vibroseis data.

The HFVS method may be described, in principle, as comprising the following steps:

1. Measuring the vibrator motion S for each vibrator and each sweep, typically using an accelerometer mounted to the vibrator base-plate. The measured signal S is related to the true vibrator output U and a minimum phase transfer function $T_1$. In the frequency domain, the equation describing the measured signal S is: $S=U*T_1$.
2. Recording the seismic data R. This seismic data represents the multiplication in the frequency domain between the earth reflectivity E, the vibrator output U and a minimum phase transfer function $T_2$: $R=U*T_2*E$.
3. Obtaining the earth reflectivity at the vibrator location by multiplying the record R with the inverse of the vibrator motion U: $R/U=T_1/T_2*E$ For an array of 4 vibrators, $V_1$, $V_2$, $V_3$, and $V_4$, sweeping simultaneously, the geophone response R is described in the frequency domain by the following linear equation: $R=m_{11}*h_1+m_{12}*h_2+m_{13}*h_3+m_{14}*h_4$. This equation contains 4 unknowns, $h_1$, $h_2$, $h_3$, and $h_4$ (the earth response at the vibrator positions $V_1$, $V_2$, $V_3$, and $V_4$) and contains the known values R (the geophone response) and $m_{11}$, $m_{12}$, $m_{13}$, and $m_{14}$ (the measured signals).

The unknowns $h_1$, $h_2$, $h_3$, and $h_4$ can be determined if another 3 sweeps are generated at the same locations and if the sweeps are encoded in such a way that the measured signal matrix is invertable. The system of linear equations is:

$R_1 = m_{11}*h_1 + m_{12}*h_2 + m_{13}*h_3 + m_{14}*h_4$ $R_2 = m_{21}*h_1 + m_{22}*h_2 + m_{23}*h_3 + m_{24}*h_4$ $R_3 = m_{31}*h_1 + m_{32}*h_2 + m_{33}*h_3 + m_{34}*h_4$ $R_4 = m_{41}*h_1 + m_{42}*h_2 + m_{43}*h_3 + m_{44}*h_4$

In matrix notation, this can be written as:

$R = m \times h$ where $$R = \begin{bmatrix} R_1 \\ R_2 \\ R_3 \\ R_4 \end{bmatrix}, \quad m = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix}, \quad \text{and } h = \begin{bmatrix} h_1 \\ h_2 \\ h_3 \\ h_4 \end{bmatrix}.$$

The typical implementation of the HFVS method in the field involves one array or group of vibrators, often four, spread out on an equal number of consecutive stations or source points. The vibrators sweep a certain number of sweeps, let say N (N being greater than or equal to the number of vibrators) at the same locations. The sweeps have the same frequency content but the phase is differently encoded to assure that the matrix M is invertible. After N sweeps, the vibrators move up a number of stations equal to the number of vibrators and repeat the sequence.

This implementation of the HFVS method has typically performed well in areas with shallow targets and good signal to noise ratios. For deeper targets or poor signal to noise areas, the standard implementation of the HFVS method may not perform well. The number of traces required for each source/receiver pair (the "fold") is also quite high, making acquisition of seismic data using this method relatively expensive.

It is therefore desirable to implement an improved method of acquiring seismic data using a plurality of vibratory seismic sources that overcomes problems exhibited by prior art seismic data acquisition methods.

An object of the present invention is to provide an improved method of acquiring seismic data using a plurality of vibratory seismic sources.

An advantage of the present invention is that for the same acquisition effort and expense, seismic data having a higher signal to noise ratio may be obtained.

Another advantage of the present method is that if coherent noise in the seismic data is band limited, it may be attenuated only in a particular frequency range, leaving the remaining frequency components of the seismic data unaffected.

SUMMARY OF THE INVENTION

The present invention provides an improved method of seismic surveying using a plurality of vibratory seismic sources, the method including the steps of:

deploying at least one seismic sensor;

deploying a plurality of vibratory seismic sources at different source points;

simultaneously actuating said seismic sources;

acquiring seismic data attributable to said seismic sources using said seismic sensor;

redeploying said seismic sources so that at least one of them is positioned at a source point previously occupied by another of them;

simultaneously actuating said redeployed seismic sources;

acquiring seismic data attributable to said redeployed seismic sources using said seismic sensor;

decomposing said acquired seismic data into components attributable to each said seismic source; and stacking together components attributable to seismic sources located at a common source point.

The invention and its benefits will be better understood with reference to the detailed description below and the accompanying drawings.

DETAILED DESCRIPTION OF THE INVENTION

Figure 1:
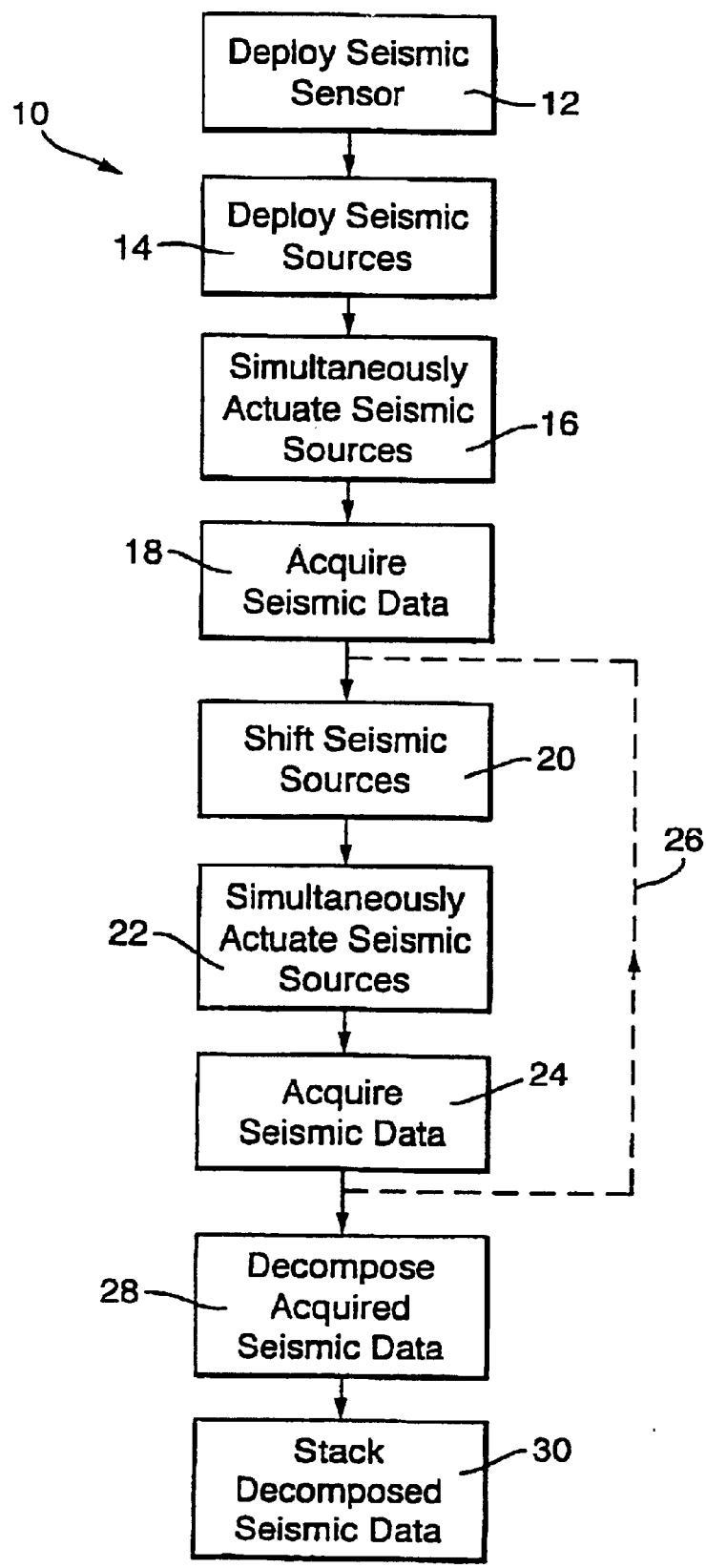
FIG. 1 is a process flow chart showing steps associated with the inventive method.

FIG. 1 is a process flowchart showing steps associated with the present method. The steps in FIG. 1 will be discussed in connection with the schematic plan view of deployed land seismic acquisition equipment shown in FIG. 2.

Figure 2:
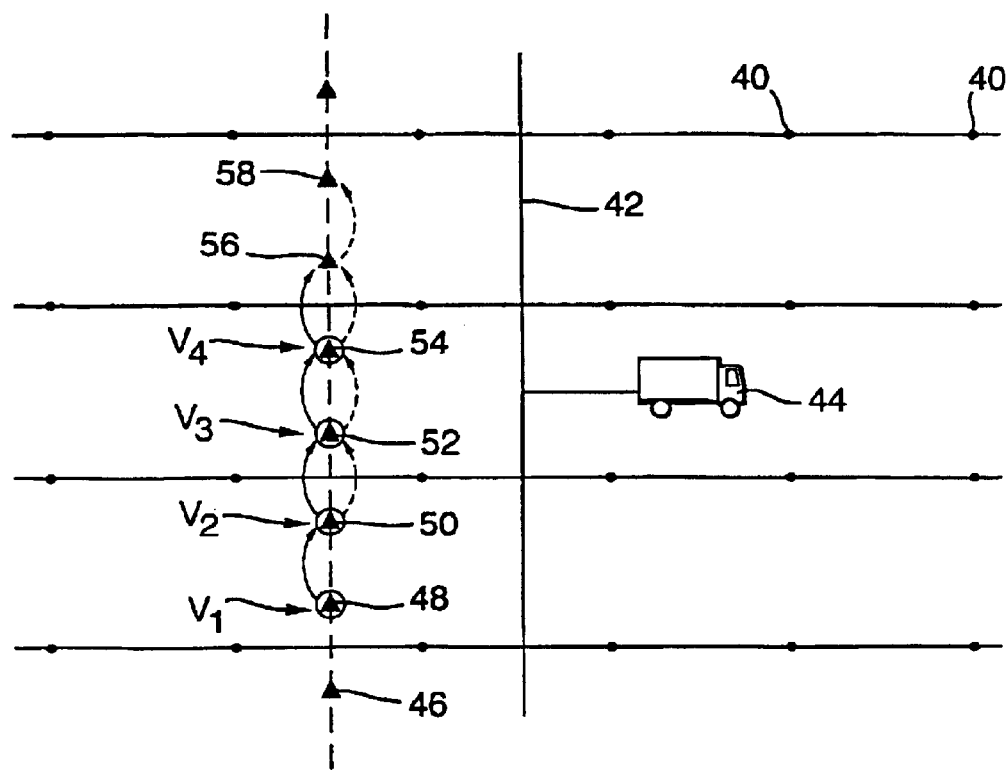
FIG. 2 is schematic plan view of an exemplary seismic data equipment layout scheme.

As noted in FIG. 1, typically the first step of the method sequence 10 is the "deploy seismic sensor" step 12. In FIG. 2, a plurality of seismic sensors 40, often geophones, are shown deployed along a plurality of parallel lines and connected to a data telemetry cable 42 which transmits the output of the sensors to a recording truck 44 where the acquired seismic data is recorded and often initially processed. FIG. 2 depicts a typical 3D land seismic survey layout, but it is only one of a vast number of alternative seismic sensor deployment schemes that could be utilized in connection with the inventive method.

Typically the second step of the method sequence 10 is the "deploy seismic sources" step 14. In FIG. 2, source points 46 are represented as triangles and four vibrators $V_1$, $V_2$, $V_3$, and $V_4$ (represented as circles) are being used in this seismic survey. Initially, in this example, vibrator $V_1$ is located at source point 48, vibrator $V_2$ is located at source point 50, vibrator $V_3$ is located at source point 52 and vibrator $V_4$ is located at source point 54.

Typically the third step of the method sequence 10 is the "simultaneously actuate seismic sources" step 14, in which all four vibrators are simultaneously actuated to produce four successive sweeps each. In general, if there are N vibrators, each will be actuated to produce M successive sweeps, where M is not less than N. The vibrators will often be both phase and frequency encoded to provide enhanced signal separability. The phase encoding scheme for could, for instance, comprise the following:

|  | $V_1$ | $V_2$ | $V_3$ | $V_4$ |
| --- | --- | --- | --- | --- |
| Sweep 1 | 90 | 0 | 0 | 0 |
| Sweep 2 | 0 | 90 | 0 | 0 |
| Sweep 3 | 0 | 0 | 90 | 0 |
| Sweep 4 | 0 | 0 | 0 | 90. |

Other methods for phase encoding the vibrator sweeps are described in the references incorporated earlier. This phase encoding assures the invertibility of the vibrator motion matrix.

To enhance the separability of the signals, the sweep bandwidth is split among the vibrators using a frequency splitting technique to provide an additional degree of orthogonality to the source signals. If the sweep bandwidth required in a certain geologic area is between $f_1$ and $f_2$ and an array of four vibrators are used to acquire the seismic data, the bandwidth may be split in the following way.

$V_1$: $[f_1, f_1+(f_2-f_1)/4]$;

$V_2$: $[f_1+(f_2-f_1)/4, f_1+(f_2-f_1)/2]$;

$V_3$: $[f_1+(f_2-f_1)/2, f_1+(f_2-f_1)*3/4]$;

and $V_4$: $[f_1+(f_2-f_1)*3/4, f_2]$.

Seismic vibrators are, however, typically hydraulically driven mechanical devices that lack the ability to rigidly cut off the production of seismic energy at any particular frequency. Generally they taper or ramp down the energy produced at the highest and lowest desired frequencies. To account for this behavior, referred to as the "sweep taper", a small overlap between the bandwidths for each vibrator may be desirable. This is shown in graphical form in FIG. 3.

Figure 3:
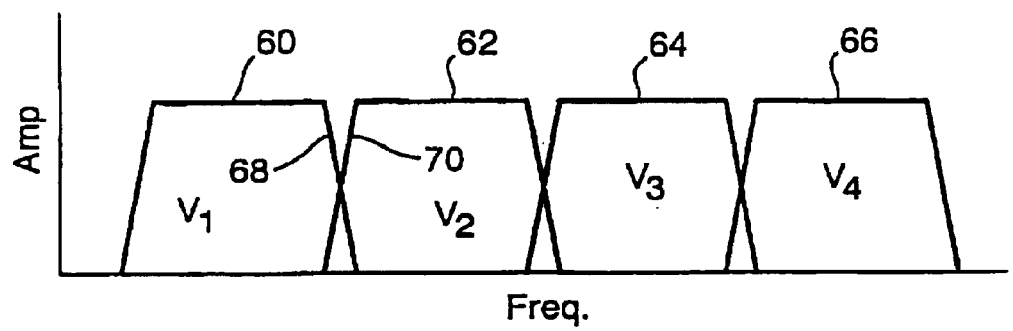
FIG. 3 is an exemplary amplitude versus frequency plot for a plurality of vibrators.

As discussed above, the desired range of frequencies is divided by the number of vibrators (in this case four) and, in addition, each of the vibrators may be assigned different (and slightly overlapping) frequency ranges. In FIG. 3, the desired range of frequencies is from 8 to 97 Hz. By following the frequency separation scheme described above, vibrator $V_1$ attempts to produce seismic energy matching the first curve 60 (8–31 Hz), vibrator $V_2$ attempts to produce seismic energy matching the second curve 62 (30–53 Hz), vibrator $V_3$ attempts to produce seismic energy matching the third curve 64 (52–75 Hz), and vibrator $V_4$ attempts to produce seismic energy matching the fourth curve 66 (74–97 Hz). The first sweep taper region 68 overlaps the second sweep taper region 70 between 30 and 31 Hz. Similar sweep taper overlaps occur between 52 and 53 Hz and between 74 and 75 Hz.

In terms of separability of the received signals, it would be preferable to eliminate any overlap of these taper zones. In many cases, however, it is desired to produce a source signal that is spectrally flat, i.e. that has substantially the same amplitude over the entire frequency range. If the signal is phase (as well as frequency) encoded, the spectral flatness benefits may overweight the reduction in separability this minor overlapping of the frequency spectra produces. The inventive method does not require that a spectrally flat signal be produced, however. In some cases, for instance, it may be preferable to weight or concentrate the seismic energy with respect to a particular frequency range or ranges, particularly if geologic conditions in a particular area substantially attenuate reflected seismic energy outside a certain narrow frequency range or ranges.

For each of the four sweeps produced when the seismic sources $V_1$ to $V_4$ are simultaneously actuated, the seismic sensors 40 will receive the seismic data in the "acquire seismic data" step 18. The seismic data is typically transmitted back to a recording truck 44 where it is recorded, preferably along with signals from respective accelerometers on each vibrator representative of the vibrator motion.

When the required number of records have been obtained, the seismic sources are redeployed in the "shift seismic sources" step 20. Using one implementation of the station-shifting technique, vibrator $V_4$ is shifted to source point 56, vibrator $V_3$ is shifted to source point 54, vibrator $V_2$ is shifted to source point 52, and vibrator $V_1$ is shifted to source point 50. The "simultaneously actuate seismic sources" step 22 and the "acquire seismic data" step 24 are then repeated the required number of times for that particular equipment layout.

Typically, the vibrators will continue to produce seismic energy in their assigned split frequency ranges, as discussed above, but other frequency range assignment schemes can easily be envisioned. For source separability reasons, it is important that the frequency range of the seismic energy produced by one simultaneously actuated seismic source be substantially outside the frequency range of the seismic energy produced by another simultaneously actuated seismic source. Preferably at least half of the seismic energy produced by one seismic source occupies a different frequency spectrum than half of the seismic energy produced by another simultaneously actuated seismic source. As noted above, some overlapping of the frequency ranges may actually be desirable, but the purpose of this frequency splitting is to allow the received seismic data to be decomposed into components attributable to different source points based, at least in part, on their differing frequency contents.

Path 26 shows that this process is repeated until the required number of records have been acquired for each vibrator for each source point. The next time the seismic sources are shifted, vibrator $V_4$ is shifted to source point 58, vibrator $V_3$ is shifted to source point 56, vibrator $V_2$ is shifted to source point 54, and vibrator $V_1$ is shifted to source point 52. After the required number of traces are acquired in this deployment setup, the vibrators are shifted one more station toward the top of FIG. 2, and the required number of traces are acquired in this new deployment setup. After completing this fourth acquire seismic data step, it will be appreciated that each of the vibrators ($V_1$, $V_2$, $V_3$, and $V_4$) have been deployed at source point 54.

Each of the traces acquired by a particular seismic sensor while a vibrator was located at source point 54 will then be decomposed or separated in the "decompose acquired seismic data" step 28. Typically this decomposition process results in individual traces for each sweep each vibrator generated at the particular source point. If four vibrators are used and they each produced four sweeps at the source point, there would be 16 output traces, four each in four separate frequency band groups. Collectively, these four separate frequency band groups cover the entire seismic bandwidth required for the seismic survey.

To increase the signal to noise ratio of the seismic data, these traces are combined ("vertically stacked") in the "stack decomposed seismic data" step 30. The traces may also be filtered prior to this stacking step. In some areas, noise, such as ground roll noise or power line noise, will be frequency band-limited. In these cases it may be desirable, for instance, to filter the frequency-limited traces containing this noise before they are stacked. This may be advantageous because noise attenuation methods may be used on the noise affected data without fearing that the noise attenuation methods may corrupt the seismic signals in the other sweep frequency ranges. This stacking process may consist of merely averaging all of the signals or more sophisticated stacking methods may be used such as the diversity stacking method discussed in U.S. Pat. No. 3,398,396 to P. Embree or the covariant stacking method discussed in our PCT Patent Application PCT/GB98/03819 (WO 99/32903) to G. Baeten, both of which are incorporated herein by reference. It should be noted that the word "stacking" when used in this context simply refers to combining and does not imply normal moveout correction or reduction to zero offset.

A significant advantage of the inventive method compared to prior art seismic data acquisition methods is that the signal to ambient noise ratio of the seismic data may be significantly improved. The signal to noise ratio of seismic data acquired using vibratory seismic sources may be calculated using the following equation:

$$\text{Signal/ambient noise} = NV * SQRT(NS * L * W)$$

where:
NV=number of vibrators;
NS=number of sweeps;
L=sweep length; and
W=sweep bandwidth.

By increasing the number of vibrators deployed at each source point (albeit sequentially, not simultaneously), the number of sweeps and the sweep length can both be reduced while simultaneously improving the signal to noise ratio of the acquired seismic data.

The separability of the sources is improved using the split bandwidth technique because the fundamental for each sweep is different and the first order harmonics generated by the third and fourth vibrator do not overlap the first and second sweep frequencies. The inventive method is capable of attenuating not only pneumatically introduced harmonics but also vibrator base-plate/earth interface introduced harmonics.

The amplitude spectrum produced by the vibrators also has larger values for narrow bandwidths and the same sweep length.

$$\text{Amplitude spectrum} = Af * SQRT(T/4 * W)$$

where:
Af=amplitude of the fundamental;
T=sweep length; and
W=sweep bandwidth.

Each of the vibrators is therefore able to transmit a greater quantity of seismic energy into the ground per time unit by limiting the bandwidth swept.

Even if the sweep bandwidth used is the same for each vibrator (i.e. the frequency splitting technique is not used), the vertical stacking/station-shifting method will still improve the signal to ambient noise ratio of the acquired seismic data. When using the vertical stacking/station-shifting technique, any specific vibrator correlated noise will be attenuated because the seismic data associated with the particular source/receiver pair will consist of data associated with each of the vibrators. In addition, the data associated with any particular source/receiver pair will typically be acquired over a larger time window, thereby helping to attenuate any ambient noise that is time variant.

The seismic data produced by the inventive method will then typically be subjected to other seismic data processing techniques such as filtering, migration, etc. that are well known in the seismic data processing art.

Figure 4:
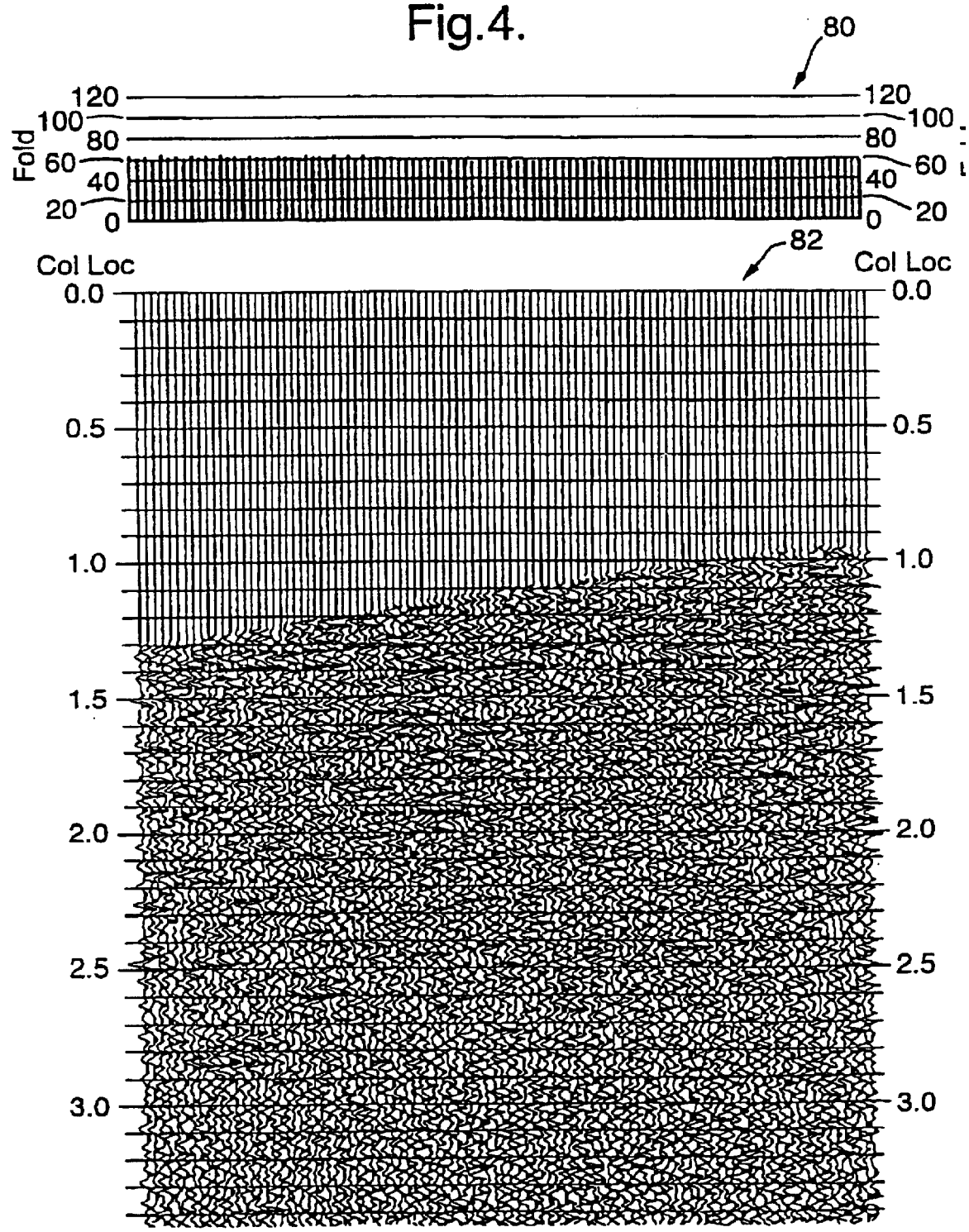
FIG. 4 is a fold distribution and seismic data section produced using a prior art seismic data acquisition method.
Figure 5:
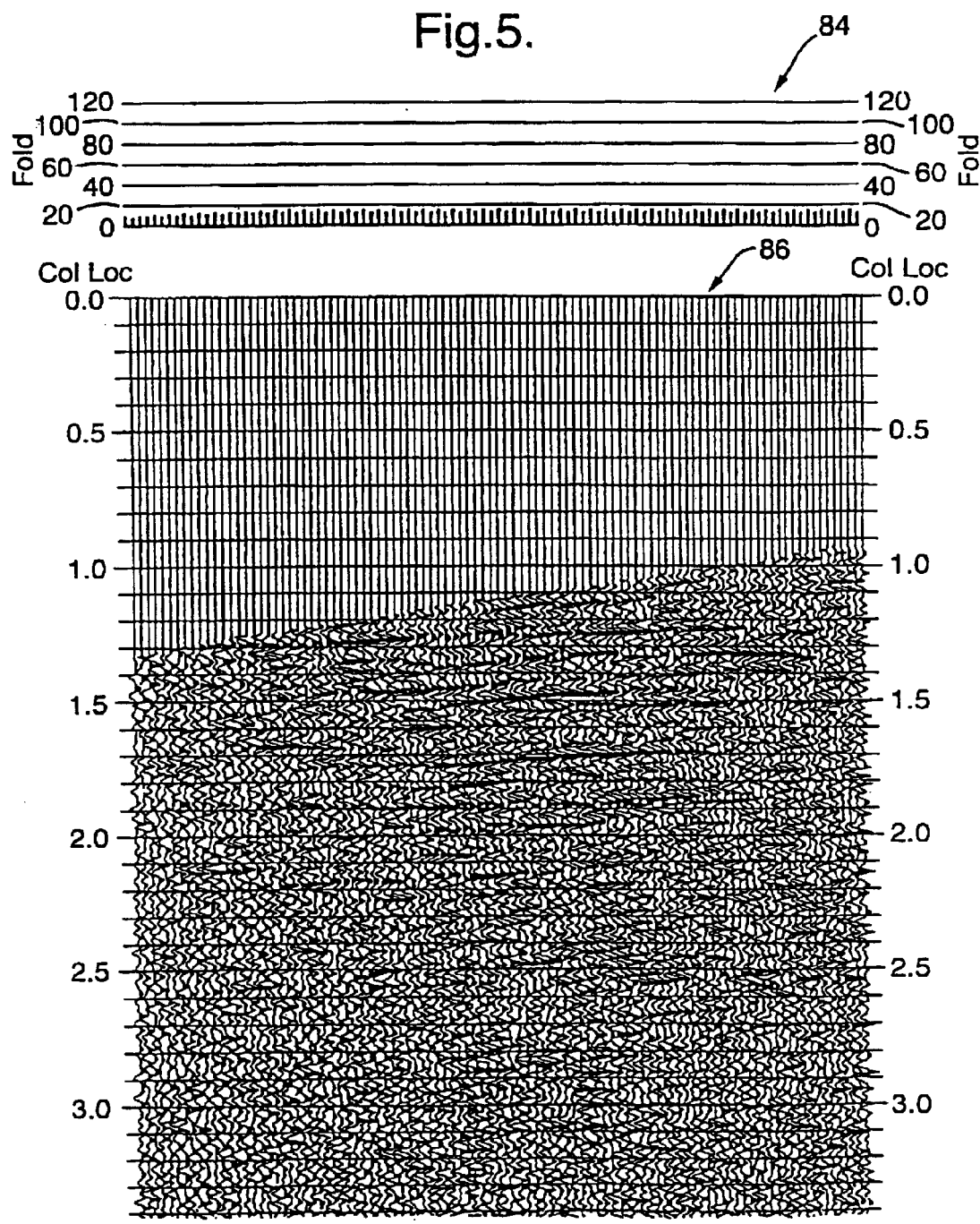
FIG. 5 is a seismic data section produced using the inventive station-shifting technique.
Figure 6:
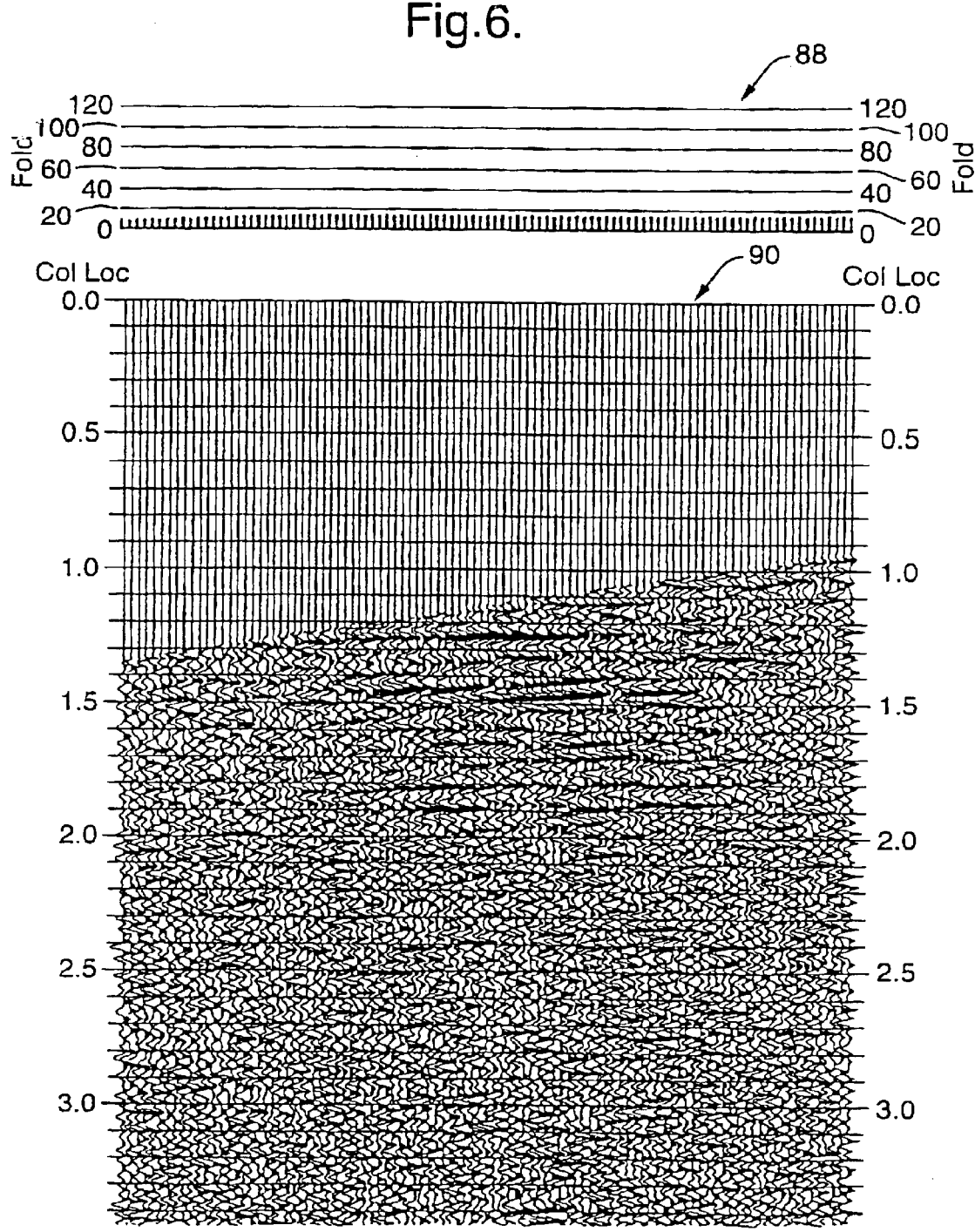
FIG. 6 is a seismic data section produced using the inventive station-shifting and frequency splitting techniques.

The benefits associated with the inventive method were confirmed using both synthetic data and in a field experiment. The results of the field experiment, which was conducted in the Delaware Basin, Ward Country, West Tex., are shown in FIGS. 4, 5, and 6. It should be noted that in contrast to the 3D acquisition geometry shown in FIG. 1, these field experiments were conducted using a 2D acquisition geometry, where the sources (vibrators) and the receivers (geophones) are deployed along a common line.

FIG. 4 shows the results of a conventional 2D HFVS seismic survey. In this experiment, four vibrators were used, the sweep frequency was from 8 to 96 Hertz, the sweep length was 10 seconds, the number of sweeps produced at each vibrator point was 8, the receiver interval spacing was 200 feet, the shot interval spacing was 50 feet, the listening time after each sweep was five seconds, and the number of stations each vibrator was shifted after completing its sweeps was 4 (200 feet). As can be seen in the fold bar chart 80 at the top of FIG. 4, the fold produced by these acquisition parameters is approximately 60. The seismic data were then processed using a standard HFVS processing sequence (separation, spiking deconvolution, NMO correction, derive and apply statics, CMP sort, and stack) to produce the reference seismic data section 82 shown in FIG. 4.

This reference seismic data section 82 can be compared against the improved seismic data section 86 shown in FIG. 5. In this experiment, many of the parameters used were identical to those used in the previous experiment: four vibrators were used, the sweep frequency was from 8 to 96 Hertz, the receiver interval spacing was 200 feet, the shot interval spacing was 50 feet, and the listening time after each sweep was five seconds. The same vibrators, sensors, and recording equipment were used for this experiment and it was conducted over the same area as the first experiment. The sweep length was, however, reduced from 10 to 4 seconds, the number of sweeps at each vibrator point was reduced from 8 to 4, and the number of stations each vibrator was shifted after completing its sweeps was 1 (50 feet). As can be seen in the fold bar chart 84 at the top of FIG. 5, the fold produced by these acquisition parameters was approximately 15 (a four-fold reduction from the previous experiment). The acquired seismic data were then processed using the same processing sequence to produce improved seismic data section 86. Many more coherent reflectors can be seen in this improved seismic data section 86 than in the reference seismic data section 82.

An experiment was also conducted using both the one-station station-shifting technique and the frequency separation technique. The results of this experiment are presented in FIG. 6. The only difference between this experiment and the previous experiment, the results of which are shown in FIG. 5, is that the four vibrators used separate sweep frequencies of 8–31, 30–53, 52–75, and 74–97 Hz, as discussed earlier. The fold was therefore unchanged, remaining at approximately 15 as shown in the fold bar chart 88 at the top of FIG. 6. It should also be noted that the seismic data section 90 was created using only the 8–31 Hz bandwidth data because the frequency response in the test area was very narrow. The enhanced seismic data section 90 appears to provide an even clearer depiction of the subsurface geology than the improved seismic data section 86.

It will be readily understood that the steps and processes associated with the disclosed embodiment of the present method are capable of a wide variety of alternative implementation methods and only a limited section from an actual seismic survey is discussed above. The described experiments imaged pressure-pressure transmission mode seismic energy, but the method is not limited to this particular seismic energy transmission mode and could, for instance, image pressure-shear converted transmission mode, shear-shear transmission mode, or multi-component seismic data. The seismic data acquired may be inverted using recorded vibrator output (using an HFVS-like method), may be inverted based on a theoretical or optimal vibrator output, or may be processed using other types of processing algorithms. The present method is also in no way limited or restricted to the particular order of steps described above.

What is claimed is:

1. A method of seismic surveying using a plurality of vibratory seismic sources, the method including the steps of:

deploying at least one seismic sensor;

deploying a plurality of vibratory seismic sources at different source points;

simultaneously actuating said seismic sources;

acquiring seismic data attributable to said seismic sources using said seismic sensor;

redeploying said seismic sources so that at least one of them is positioned at a source point previously occupied by another of them;

simultaneously actuating said redeployed seismic sources;

acquiring seismic data attributable to said redeployed seismic sources using said seismic source;

decomposing said acquired seismic data into components attributable to each said seismic source; and stacking together components attributable to seismic sources located at a common source point.

2. A method according to claim 1, wherein said simultaneously actuating steps each comprise simultaneously actuating each seismic source M times at each source point, where M is not less than the number of seismic sources.

3. A method according to claim 1, further including the step of noise attenuating at least one of said components before said components are stacked together.

4. A method according to claim 1, wherein the respective outputs of said seismic sources are recorded and used in processing said acquired seismic data.

5. A method according to claim 1, wherein said seismic data is inverted using theoretical or optimal seismic source output.

6. A method according to claim 1, wherein each said seismic source is capable of producing seismic energy within a respective frequency range and the frequency range of the seismic energy produced by one said seismic source is substantially outside the frequency range of seismic energy produced by anon said seismic source when said seismic sources are simultaneously actuated.

7. A method according to claim 6, wherein said seismic sources have sweep tapers and a sweep taper of one said seismic source overlaps a sweep taper of another said seismic source.

8. A method according to claim 6, wherein the frequency range of one said seismic source has first order harmonics that do not overlap the frequency range of another said seismic source.

9. A method according to claim 1, wherein said redeploying step comprises shifting said seismic sources one said source point in a common direction upon a common path.

* * * * *